(12) United States Patent
Munn et al.

(10) Patent No.: US 7,322,647 B2
(45) Date of Patent: Jan. 29, 2008

(54) ADJUSTABLE HEADREST FOR JUVENILE VEHICLE SEAT

(75) Inventors: Ronald F. Munn, Hope, IN (US);
William Horton, Hope, IN (US);
Philip W. Burbrink, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/149,749

(22) Filed: Jun. 10, 2005

(65) Prior Publication Data

US 2006/0279117 A1    Dec. 14, 2006

(51) Int. Cl.
*B60N 2/26*    (2006.01)
*A47C 1/10*    (2006.01)

(52) U.S. Cl. ............... 297/250.1; 297/410; 297/411.36
(58) Field of Classification Search ............. 297/250.1, 297/256.1, 410, 411.36, 344.18; 248/118, 248/407, 408; 403/377, 378, 152, 109.3, 403/109.6
See application file for complete search history.

(56) References Cited

U.S. PATENT DOCUMENTS

| | | | | |
|---|---|---|---|---|
| 3,200,464 A | * | 8/1965 | Cousins ................... 24/593.1 |
| 5,938,285 A | | 8/1999 | Verbeek | |
| 6,062,645 A | * | 5/2000 | Russell ........................ 297/410 |
| 6,273,509 B1 | * | 8/2001 | Reithmeier et al. ......... 297/410 |
| 6,378,950 B1 | | 4/2002 | Takamizu et al. | |
| 6,464,294 B1 | * | 10/2002 | Kain ........................ 297/250.1 |
| 6,488,339 B1 | | 12/2002 | Finner et al. | |
| 6,623,074 B2 | * | 9/2003 | Asbach et al. ............ 297/250.1 |
| 6,802,565 B2 | * | 10/2004 | Isaacson ..................... 297/410 |
| 6,811,216 B2 | * | 11/2004 | Sedlack .................... 297/250.1 |
| 6,908,151 B2 | * | 6/2005 | Meeker et al. ........... 297/250.1 |
| 7,055,903 B2 | * | 6/2006 | Balensiefer et al. ... 297/256.11 |
| 2003/0151282 A1 | | 8/2003 | Williams et al. | |
| 2003/0164631 A1 | * | 9/2003 | Sedlack .................... 297/250.1 |
| 2004/0070244 A1 | * | 4/2004 | Williams et al. ......... 297/250.1 |
| 2004/0124678 A1 | | 7/2004 | Williams et al. | |
| 2005/0225136 A1 | * | 10/2005 | Horton et al. ............ 297/250.1 |

\* cited by examiner

*Primary Examiner*—Sarah B. McPartlin
(74) *Attorney, Agent, or Firm*—Barnes & Thornburg LLP

(57) ABSTRACT

A juvenile vehicle seat unit includes a seat and a headrest mounted for up-and-down movement on a headrest support included in the seat. The seat unit also includes a headrest height-adjustment mechanism coupled to the headrest and to the headrest support.

32 Claims, 5 Drawing Sheets

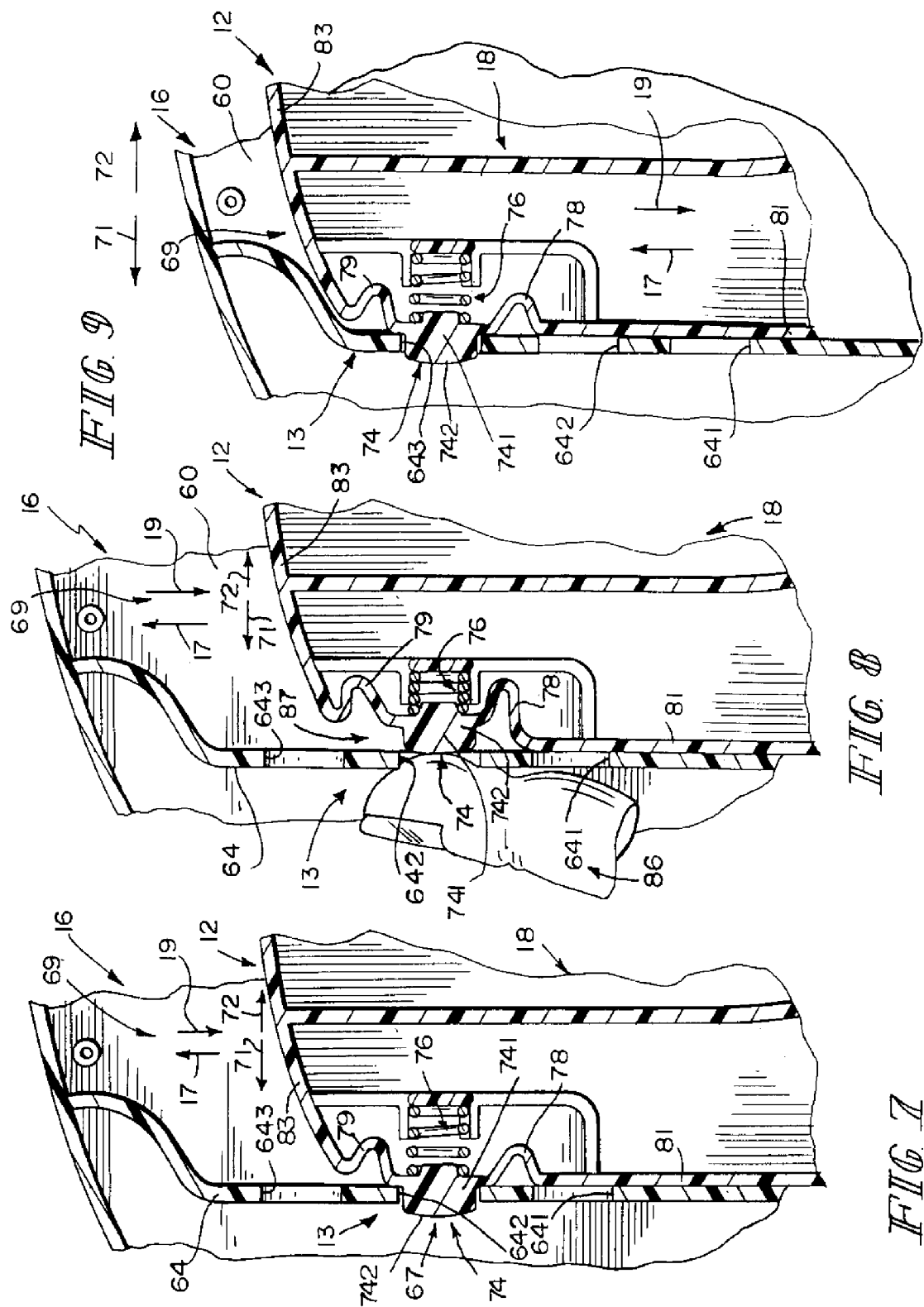

ADJUSTABLE HEADREST FOR JUVENILE VEHICLE SEAT

BACKGROUND

The present disclosure relates to juvenile vehicle seats, and, in particular, to backrests for juvenile vehicle seats. More particularly, the present disclosure relates to a backrest mounted on a seat base to provide a juvenile vehicle seat.

SUMMARY

A juvenile vehicle seat unit in accordance with the present disclosure includes a seat including a backrest and a headrest mounted for up-and-down movement on the backrest relative to a seat bottom also included in the seat. The seat unit also includes a headrest height-adjustment mechanism coupled to the headrest and to the backrest.

In illustrative embodiments, the headrest height-adjustment mechanism includes a movable headrest anchor mounted for movement relative to the backrest and an anchor retainer strip arranged to extend from the headrest in a rearward direction to lie alongside the backrest and locate the movable headrest anchor in a space provided between the anchor retainer strip and the backrest. The headrest anchor includes an anchor button that is spring-biased normally to extend into one of several anchor receivers formed in the anchor retainer strip whenever the headrest is moved to one of several predetermined elevated positions established by the anchor receivers to establish a fixed elevated position of the headrest relative to the seat bottom.

In illustrative embodiments, the anchor retainer strip is cantilevered to a rearwardly facing surface of the headrest and formed to include three anchor receivers. Each anchor receiver is located at a different elevation with respect to the seat bottom and arranged to receive the anchor button therein so as to establish lowest, middle, and highest fixed positions of the headrest relative to the seat bottom and to the backrest.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIGS. 7-9 illustrate a sequence of operating the headrest anchor to change the height of the headrest relative to the backrest;

FIG. 7 is a sectional view taken along line 7-7 after the headrest anchor has been moved to extend into a middle one of the three anchor receivers to establish the middle position of the headrest relative to the backrest;

FIG. 8 is a sectional view similar to FIG. 7 showing inward movement of the headrest anchor to disengage the middle anchor receiver associated with the headrest to free the headrest for up-and-down movement relative to the backrest; and FIG. 9 is a sectional view similar to FIGS. 7 and 8 after the headrest anchor has been moved to extend into a highest one of the three anchor receivers to establish the lowest position of the headrest relative to the backrest shown in solid in FIG. 2.

DETAILED DESCRIPTION OF THE DRAWINGS

Figure 1:
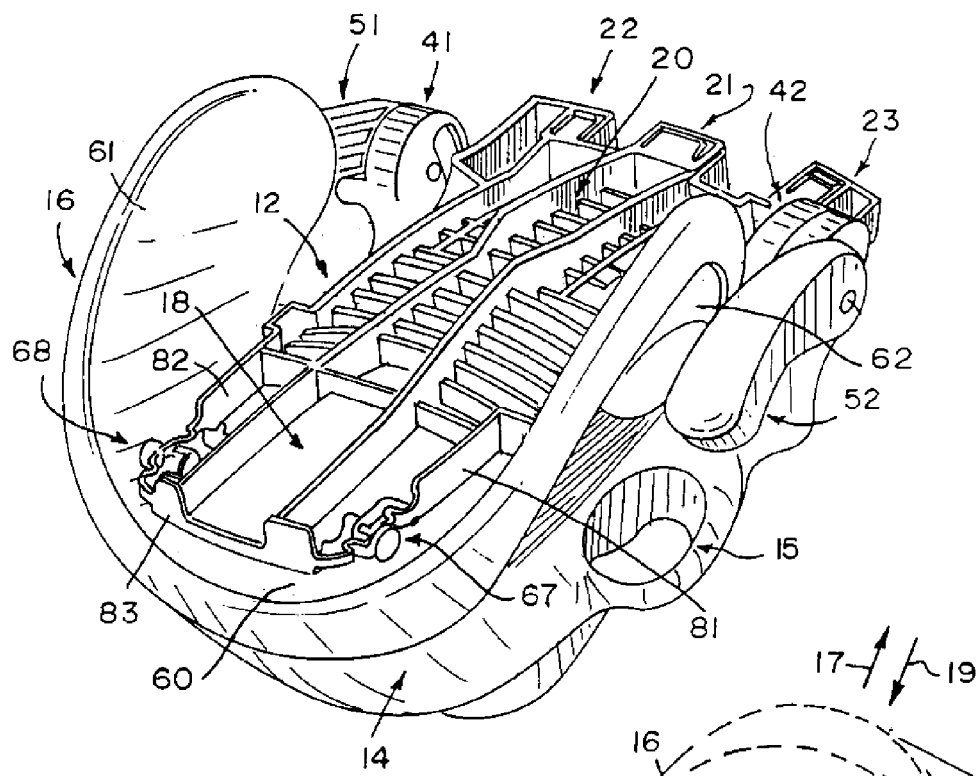
FIG. 1 is a perspective view of a disassembled juvenile vehicle seat packed to be stored in a shipping carton (not shown), the juvenile vehicle seat including a seat base formed to include cup holders and armrest mounts carrying pivotable cantilevered armrests, a headrest placed on a seat bottom included in the seat base and located between the armrest, and a backrest arranged loosely to overlie the seat bottom to "sandwich" the headrest between the seat bottom and the backrest.

A juvenile vehicle seat 10 includes a backrest 12, a seat base 14 carrying armrests 51 and 52, a headrest 16, and a height-adjustment mechanism 13 for headrest 16, as shown, for example, in FIGS. 1-4. This seat 10 can be shipped in an unassembled state in a relatively small and compact carton (not shown) as suggested in FIG. 1. A purchaser can remove the disassembled and packed seat shown in FIG. 3 from the shipping carton and separate the components 12, 14, 16 in the manner shown, for example, in FIG. 4. The components 12, 14, 16 can then be assembled by the purchaser to produce an assembled juvenile vehicle seat 10 as shown, for example, in FIG. 2.

Figure 4:
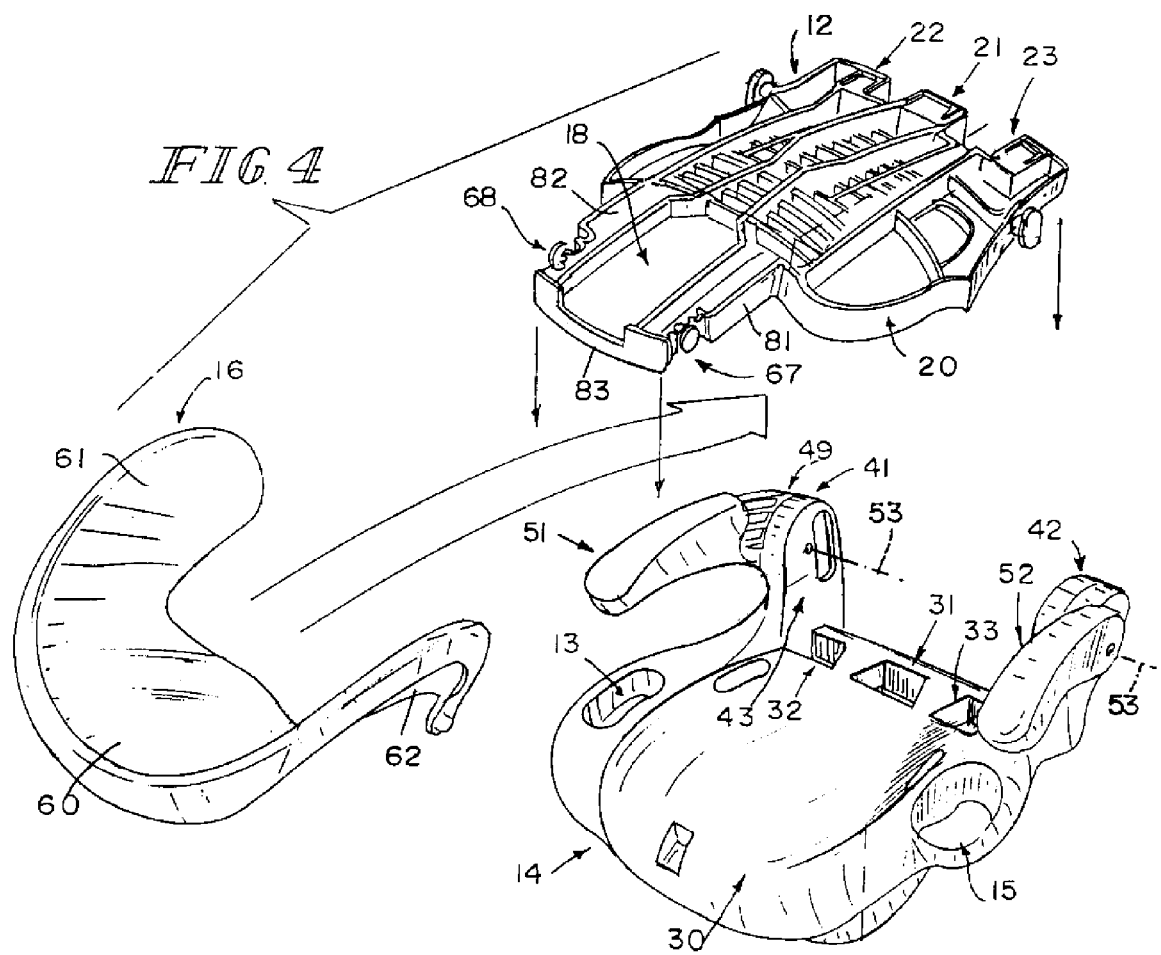
FIG. 4 is a perspective view similar to FIG. 1 showing insertion of the headrest into a storage space above the seat base and below the backrest to achieve its packed and stored position between the seat base and the backrest preparatory to placement of the illustrated components into a shipping carton.

As shown best in FIGS. 1 and 4, backrest 12 includes a headrest support 18, seat back 20 coupled to headrest support 18, and first, second, and third posts 21, 22, 23 coupled to seat back 20. Seat back 20 is interposed between headrest support 18 and the three posts 21, 22, 23. Seat base 14 includes seat bottom 30 and first, second, and third sockets 31, 32, 33 and carries first and second armrests 51, 52. Posts 21, 22, 23 mate with sockets 31, 32, 33 to orient backrest 12 in an upright seat-forming position as shown, for example, in FIG. 2.

Headrest 16 is mounted for movement on headrest support 18 of backrest 12 in up-and-down directions 17, 19 to adjust the height of headrest 16 relative to backrest 12. A headrest height-adjustment mechanism (height adjustor) 13 is coupled to backrest 12 and headrest 16 as suggested in FIGS. 5 and 6 and is configured to be operated by a user to change the elevation of headrest 16 as suggested in FIGS. 7-9.

Figure 5:
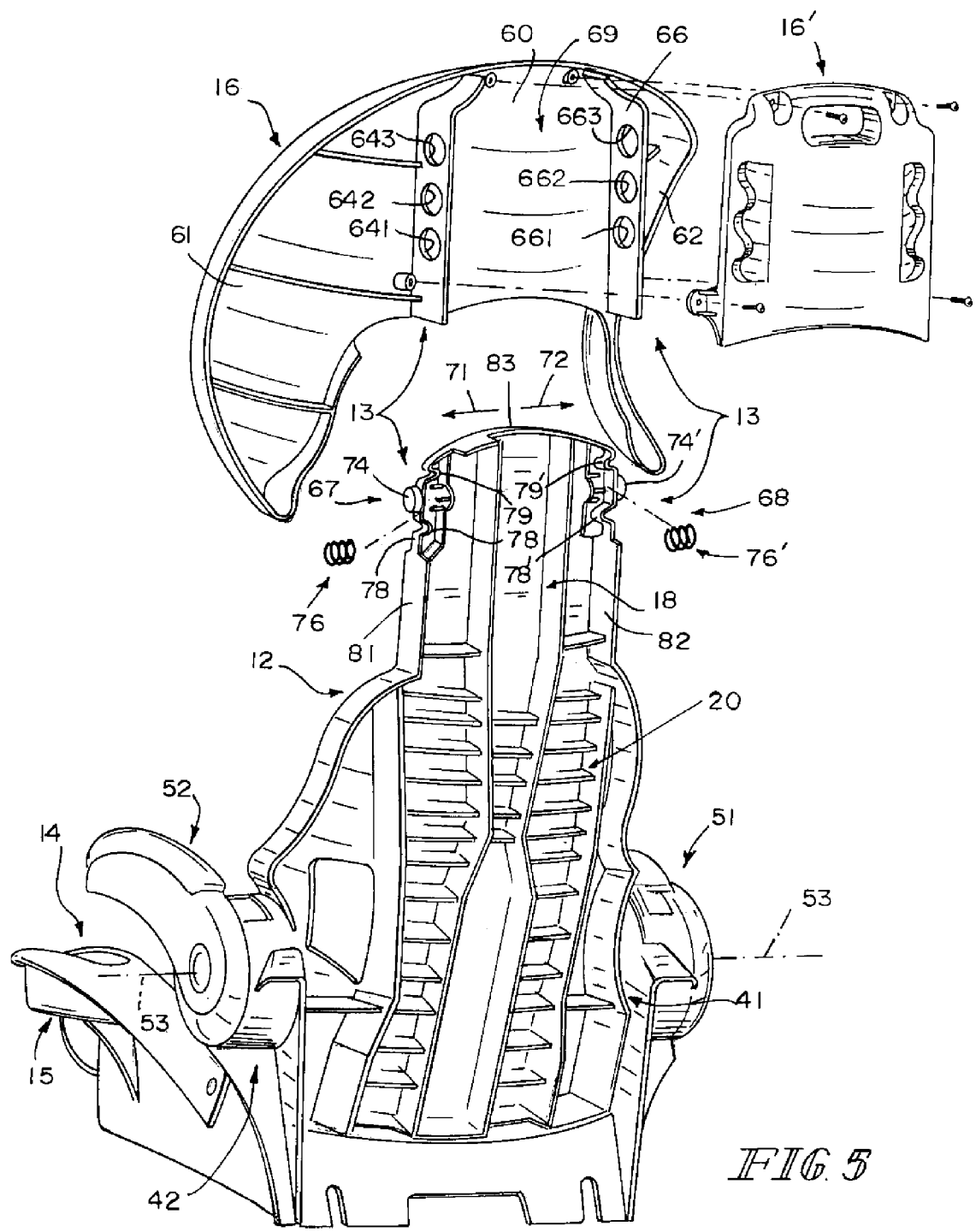
FIG. 5 is an exploded perspective assembly view of the juvenile vehicle seat showing the headrest and a headrest height-adjustment mechanism associated with the backrest and the headrest.

As shown best in FIGS. 4 and 5, seat base 14 further includes a first backrest support 41 arranged to extend upwardly from seat bottom 30 and a second backrest support 42 also arranged to extend upwardly from seat bottom 30. First and second backrest supports 41, 42 are arranged to lie in spaced-apart relation to one another along a rear portion of seat bottom 30 to locate backrest 12 therebetween as shown, for example, in FIG. 2 after components 12, 14, 16 have been assembled to produce juvenile vehicle seat 10.

Seat base 14 is also formed to include a first cup holder 13 and a second cup holder 15 arranged to lie in spaced-apart relation to first cup holder 13 to locate seat bottom 30 therebetween. First cup holder 13 is arranged to lie forward of first backrest support 41. Second cup holder 15 is arranged to lie forward of second backrest support 42. In the illustrated embodiment, seat base 14 is a monolithic element made of a suitable plastics material.

Juvenile vehicle seat 10 includes a first armrest 51 coupled to first backrest support 41 and a second armrest 52 coupled to second backrest support 42. These armrests 51, 52 are arranged to extend normally in a forward direction relative to and away from seat back 20 of backrest 12 as suggested in FIGS. 1 and 2. In the illustrated embodiment, first and second armrests 51, 52 are mounted on seat base 14 (e.g., first and second backrest supports 41, 42) for pivotable movement about a pivot axis 53 shown, for example, in FIG. 5.

When disassembled, backrest 12, seat base 14, headrest 16, and armrests 51, 52 are packed in a manner shown, for example, in FIG. 1 in a shipping carton (not shown). Headrest 16 is placed on seat bottom 30 of seat base 14 and located between armrests 51, 52 carried on seat base 14. Backrest 12 is arranged loosely to overlie seat bottom 30 and to "sandwich" headrest 16 between seat bottom 30 and headrest support 18 of backrest 12. Movement of headrest 16 to its packed and stored position between seat base 14 and backrest 12 is shown, for example, in FIG. 4.

As shown best in FIG. 5, headrest 16 includes a head-engagement panel 60 interposed between first and second side wing panels 61, 62. In the illustrated embodiment, headrest 16 is a monolithic element made of a plastics material. A back cover 16' is coupled to headrest 16 as suggested in FIG. 5.

Height adjustor 13 includes first and second anchor retainers 64 66 coupled to headrest 16, a first headrest anchor 67 coupled to headrest support 18 and associated with first anchor retainer 64, and a second headrest anchor 68 coupled to headrest support 18 and associated with second anchor retainer 64 as shown, for example, in FIG. 5. In the illustrated embodiment, first anchor retainer 64 is formed to include a series of three anchor receivers (e.g., apertures) 641, 642, and 643 and each of these anchor receivers 641, 642, 643 is adapted to receive a portion of first headrest anchor 67 therein to block up-and-down movement of headrest 16 in directions 17 and 19 relative to headrest support 18. Similarly, second anchor retainer 66 is formed to include a series of three more anchor receivers (e.g., apertures) 661, 662, and 663, and each of those anchor receivers 661, 662, 663 is adapted to receive a portion of second headrest anchor 68 therein to help block up-and-down movement of headrest 16 in directions 17 and 19 relative to headrest support 18.

Figure 6:
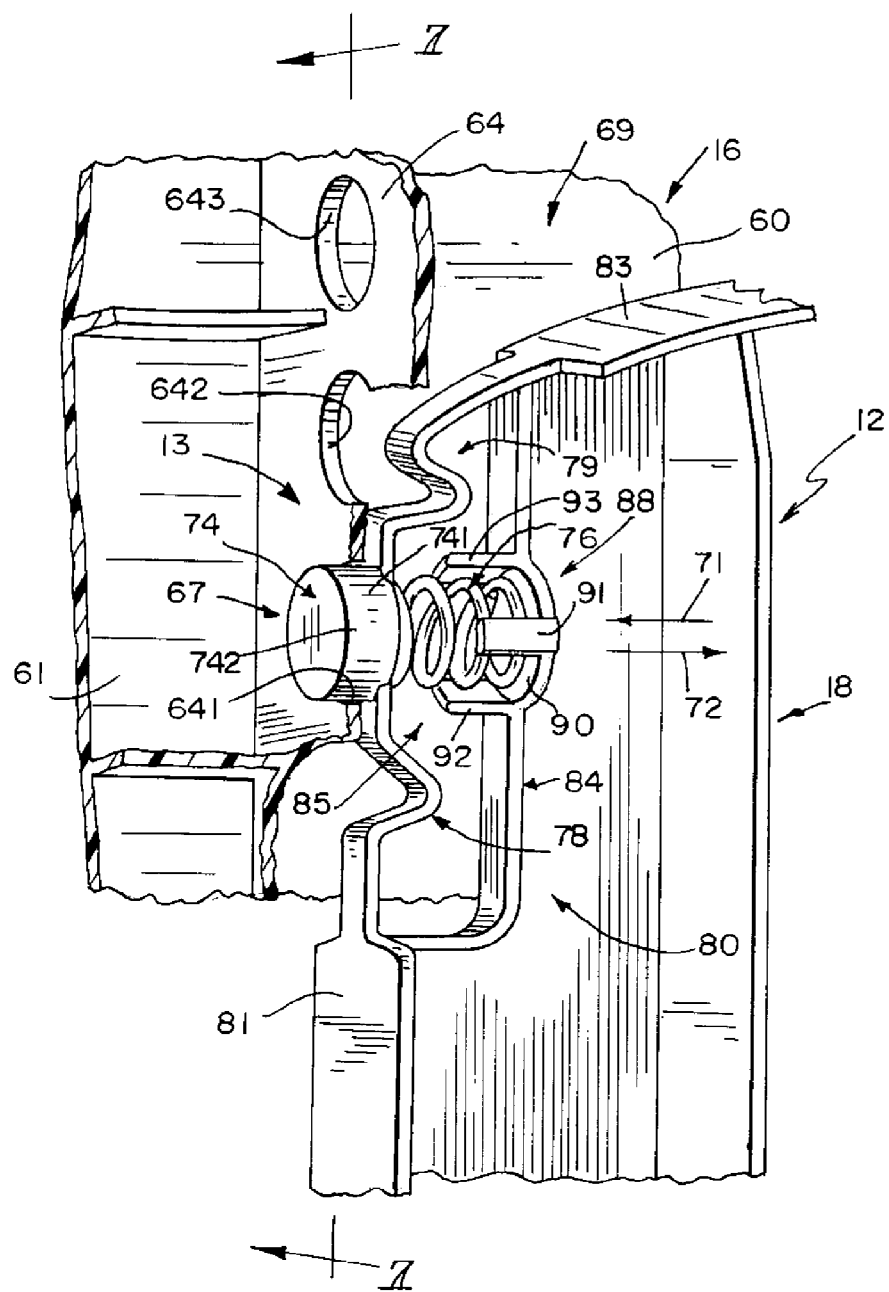
FIG. 6 is an enlarged perspective view of a portion of the headrest height-adjustment mechanism illustrated in FIG. 5 showing a headrest anchor associated with the backrest arranged to extend into a lowest one of the three anchor receivers associated with the headrest to establish the highest position of the headrest relative to the backrest and showing an illustrative anchor button and coiled compression spring cooperating to define the headrest anchor.

Headrest support 18 is arranged to extend upwardly from seat back 20 to lie in a space 69 provided between first and second anchor retainers 64, 66 on a rear side of head-engagement panel 60 as suggested in FIGS. 5 and 6. First headrest anchor 67 is coupled to headrest support 18 and arranged to face in a first direction 71 toward anchor receivers 641, 642, 643 formed in first anchor retainer 64 as headrest 16 is moved in up-and-down directions 17, 19 relative to backrest 12 while a portion of headrest support 18 carrying first headrest anchor 67 lies between first and second anchor retainers 64,66. Likewise, second headrest anchor 68 is coupled to headrest support 18 and arranged to face in an opposite second direction 72 toward anchor receivers 661, 662, 663 formed in second anchor retainer 66 as headrest 16 is moved in up-and-down directions 17, 19 relative to backrest 12 while a portion of headrest support 18 carrying second headrest anchor 68 lies between first and second anchor retainers 64, 66.

In an illustrative embodiment, first headrest anchor 67 comprises a first anchor button 74, a button-biasing spring 76, and a tether including flexible lower and upper button tethers 78, 79 as shown, for example, in FIGS. 6-9. In the illustrated embodiment, second headrest anchor 68 comprises a second anchor button 74', a button-biasing spring 76', and a tether including flexible lower and upper button tethers 78', 79' as shown, for example, in FIG. 5.

As suggested in FIG. 6, first anchor retainer 64 is formed to include a lowest anchor receiver 641 associated with a highest position of headrest 16. First anchor retainer 64 is also formed to include a middle anchor receiver 642 associated with a middle position of headrest 16 as shown, for example, in FIG. 7. First anchor retainer 64 is also formed to include a highest anchor receiver 643 associated with a lowest position of headrest 16 as shown, for example, in FIG. 9. It is within the scope of this disclosure to form any number of anchor receivers in first anchor retainer 64 to establish a like number of predetermined elevation positions of headrest 16 above seat bottom 30. As suggested in FIGS. 6-9, first headrest anchor 67 is mounted for movement on headrest support 18 between a mated position extending into one of anchor receivers 641, 642, 643 to establish a fixed elevated position of headrest 16 relative to headrest support 18 and an unmated position (see FIG. 8) disengaging each of anchor receivers 641, 642, 643 to allow up-and-down movement of headrest 16 in directions 17, 19 relative to headrest support 18.

In the illustrated embodiment, headrest support 18 includes a support plate 80, first and second vertically extending side rims 81, 82 coupled to perimeter edges of support plate 80, and a horizontally extending upper rim 83 coupled to a perimeter edge of support plate 80 as shown, for example, in FIGS. 5 and 6. First headrest anchor 67 is arranged to interconnect first side rim 81 and upper rim 83 as shown in FIGS. 5 and 6. Second headrest anchor 68 is arranged to interconnect upper rim 83 and second side rim 82 as shown in FIG. 6.

As suggested in FIGS. 6, 7, and 9, first anchor button 74 is sized and arranged to extend into either the lowest, middle, or highest anchor receiver 641, 642, 643 upon movement of first headrest anchor 67 in first direction 71 to the mated position. In the illustrated embodiment, flexible lower button tether 78 has a lower end coupled to first side rim 81 and an upper end coupled to first anchor button 74 while flexible upper button tether 79 has a lower end coupled to first anchor button 74 and an upper end coupled to upper rim 83. As suggested in FIGS. 6-9, flexible lower and upper button tethers 78, 79 cooperate to support first anchor button 74 for controlled movement relative to headrest 16 during movement of first headrest anchor 67 between the mated and unmated positions.

As shown best in FIG. 6, a perimeter edge 84 of support plate 80 cooperates with first anchor button 74 to define a spring-receiver space 85 therebetween. Button-biasing spring 76 of first headrest anchor 67 is located in spring-receiver space 85 and interposed between first anchor button 74 and support plate 80. Button-biasing spring 76 is also arranged normally to urge first anchor button 74 into either the lowest, middle, or highest anchor receiver 641, 642, 643 upon movement of headrest 16 on headrest support 18 to place first anchor button 74 in confronting relation to one of the anchor receivers 641, 642, 643 as suggested, for example, in FIGS. 6, 7, and 9.

As suggested in FIG. 6, backrest 12 includes a monolithic section made of a plastics material and configured to include first side and upper rims 81, 83, first anchor button 74, and flexible lower and upper button tethers 78, 79. Each of tethers 78, 79 has a serpentine shape and is made of a somewhat stiff but deformable elastic material that is able to retain an initial shape as shown, for example, in FIG. 6.

An outer end of button-biasing spring 76 acts against first anchor button 74 and an inner end of spring 76 acts against support plate 80 of headrest support 18 as shown, for example, in FIGS. 6-9. First anchor button 74 includes an inner portion 741 and an outer portion 742. Inner portion 741 is arranged to lie in either anchor receiver 641, 642, or 643 and outer portion 742 is arranged to lie outside space 85 and anchor receivers 641, 642, and 643 upon movement of first headrest anchor 67 in first direction 71 to the mated position as shown, for example, in FIGS. 6, 7, and 9. In this position, outer portion 742 is presented in an "exposed" position so that it can be touched easily by a finger 86 of a headrest operator as shown, for example, in FIG. 8. Outer portion 742 is arranged to pass in second direction 72 through anchor receiver 642 (as well as other anchor receivers 641, 643) to overcome a biasing force applied by button-biasing spring 76 to first anchor button 74 to reach a space 87 provided between first anchor retainer 64 and headrest support 18 upon movement of first headrest anchor 67 in second direction 72 to the unmated position as shown, for example, in FIG. 8, to free headrest 16 for up-and-down movement in directions 17, 19 relative to headrest support 18.

Support plate 80 is formed to include a spring mount support 88 facing toward anchor receivers 641, 642, 643 during up-and-down movement of headrest 16 relative to headrest support 18. As shown in FIG. 6, spring mount support 88 is formed to include a base 90 and three spring guides 91, 92, 93 cantilevered to base 90 and arranged to extend away from support plate 80 and toward first anchor retainer 64 to define a region containing a portion of button-receiving spring 76 therebetween.

As shown best in FIGS. 5 and 6, first anchor button 74 is cylinder-shaped and button-biasing spring 76 is a coiled compression spring. As suggested in FIG. 7, first anchor button 74 includes a protrusion extending into an opening formed in the outer end of coiled compression spring 76.

In the illustrated embodiment, each anchor retainer 67 is a thin strip made of plastics material. Headrest 16 includes a monolithic section made of a plastics material and configured to include head-engagement panel 60 and anchor retainers 64, 66. During use, headrest 16 is constrained to move up and down on headrest support 18 in directions 17, 19 along a substantially vertical line and anchor buttons 74, 74' are constrained to move back and forth on headrest support 18 in directions 71, 72 along a substantially horizontal line as suggested in the drawings.

Figure 2:
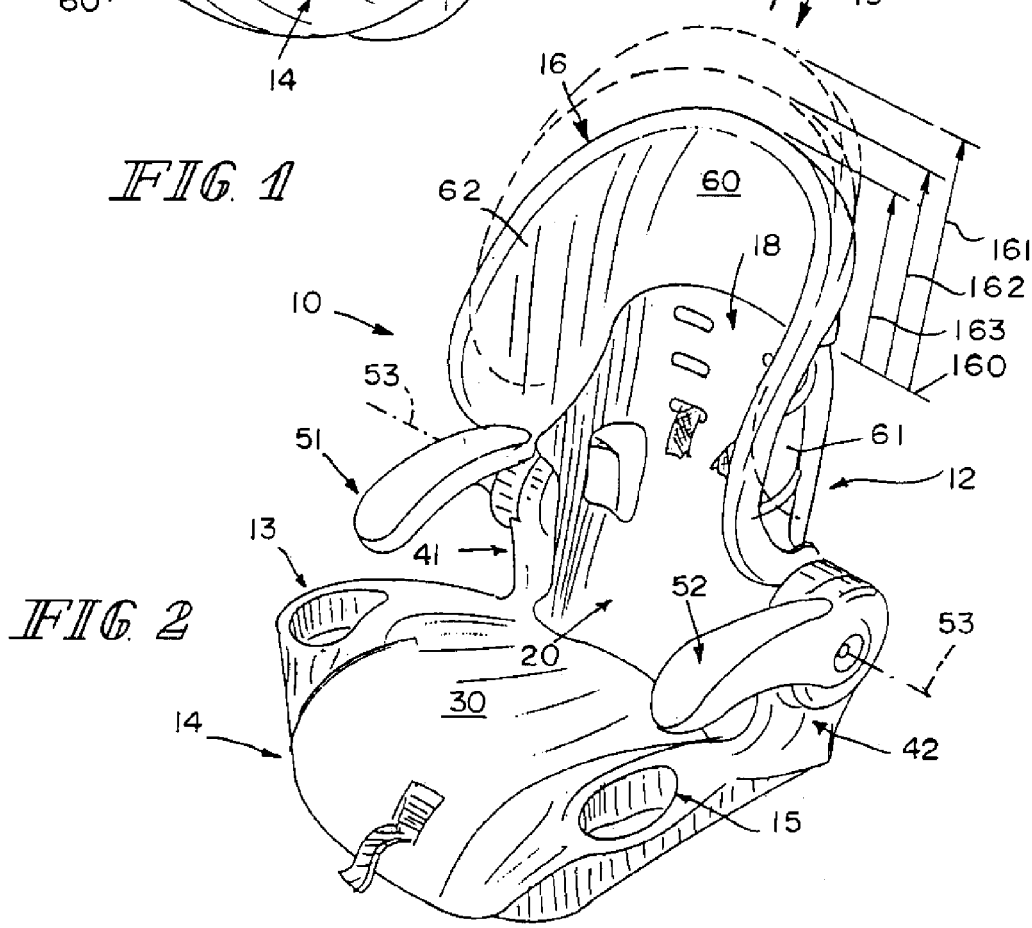
FIG. 2 is a perspective view of a juvenile seat in accordance with the present disclosure assembled using the separate components shown in FIG. 1 and showing the backrest coupled to the seat base to lie in an upright position relative to the seat bottom and showing the headrest coupled to an upper portion of the backrest and arranged to lie in a "lowest" position relative to the backrest and to be moved upwardly relative to the backrest to "middle" and "highest" positions.
Figure 3:
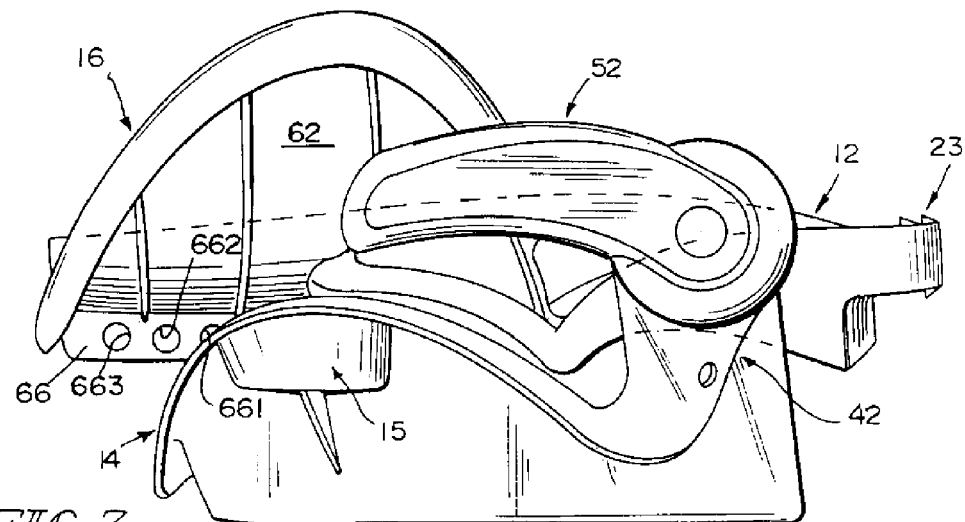
FIG. 3 is a side elevation view of the disassembled and packed juvenile vehicle seat of FIG. 1.

Height adjustor 13 can be used to adjust the height of headrest 16 relative to headrest support 18 as shown, for example, in FIG. 2. When first and second anchor buttons 74, 74' extend into lowest anchor receivers 641, 661 formed in anchor retainers 64, 66, then the top of headrest 16 is arranged to extend a "highest" distance 161 above a reference line 160 associated with headrest support 18. Movement of anchor buttons 74, 74' into middle anchor receivers 642, 662 formed in anchor retainers 64, 66 cause the top of headrest 16 to extend a lesser "middle" distance 162 above reference line 160. Movement of anchor buttons 74, 74' into highest anchor receivers 643, 663 formed in anchor retainers 64, 66 cause the top of headrest 16 to extend a still lesser "lowest" distance 163 above reference line 160.

The invention claimed is:

1. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, and wherein the headrest support includes a vertically extending side rim and a horizontally extending upper rim and the headrest anchor is arranged to interconnect the side rim and the upper rim.

2. The seat unit of claim 1, wherein the headrest anchor includes an anchor button sized and arranged to extend into one of the lowest and highest anchor receiver upon movement of the headrest anchor to the mated position, a flexible lower button tether having a lower end coupled to the side rim and an upper end coupled to the anchor button, and a flexible upper button tether having a lower end coupled to the anchor button and an upper end coupled to the upper rim, and wherein the flexible lower and upper button tethers cooperate to support the anchor button for controlled movement relative to the headrest during movement of the headrest anchor between the mated and unmated positions.

3. The seat unit of claim 2, wherein the headrest support further includes a support plate coupled to the side and upper rims and arranged to cooperate with the anchor button and wherein the headrest anchor further includes a button-biasing spring located in a spring-receiver space interposed between the anchor button and the support plate, the spring arranged normally to urge the anchor button into one of the lowest and highest anchor receiver upon movement of the headrest on the headrest support to place the anchor button in confronting relation to one of the lowest and highest anchor receiver.

4. The seat unit of claim 2, wherein the backrest includes a monolithic section made of a plastics material and configured to include the side and upper rims, the anchor button, and the flexible lower and upper button tethers.

5. The seat unit of claim 2, wherein at least one of the flexible upper and lower button tethers has a serpentine shape.

6. The seat unit of claim 2, wherein each of the flexible upper and lower button tethers is made of a deformable elastic material.

7. The seat unit of claim 2, wherein the anchor retainer is a strip of plastics material formed to include a lowest aperture defining the lowest anchor receiver and a highest aperture defining the highest anchor receiver, the headrest anchor further includes a button-biasing spring having an outer end acting against the anchor button and an inner end acting against the headrest support, the anchor button includes an inner portion arranged to lie in one of the lowest and highest apertures upon movement of the headrest anchor to the mated position, and the anchor button further includes an outer portion arranged to lie outside one of the lowest and highest apertures upon movement of the headrest anchor to the mated position and to pass through one of the lowest and highest apertures to overcome a biasing force applied by the button-biasing spring to the anchor button to reach a space provided between the anchor retainer and the headrest support upon movement of the headrest anchor to the unmated position to free the headrest for up-and-down movement relative to the headrest support.

8. The seat unit of claim 2, wherein the backrest further includes a support plate coupled to the side and upper rims and formed to include a spring mount support facing toward the anchor receivers during up-and-down movement of the headrest relative to the headrest support and wherein the headrest anchor includes an anchor button sized and arranged to extend through one of the lowest and highest anchor receiver upon movement of the headrest anchor to the mated position and a button-biasing spring interposed between the anchor button and the spring mount support and configured normally to urge the anchor button into one of the lowest and highest anchor receiver upon movement of the headrest on the headrest support to place the anchor button in confronting relation to one of the lowest and highest anchor receiver.

9. The seat unit of claim 8, wherein the headrest support further includes a support plate coupled to the seat back and a tether coupled to the anchor button and arranged to limit movement of the anchor button relative to the support plate.

10. The seat unit of claim 8, wherein the spring mount support is formed to include a base and at least two spring guides cantilevered to the base and arranged to extend away from the support plate and toward the anchor retainer to define a region containing a portion of the button-biasing spring therebetween.

11. The seat unit of claim 8, wherein the anchor button is cylinder-shaped and the button-biasing spring is a coiled compression spring having an inner end acting against the spring mount support and an outer end acting against the cylinder-shaped anchor button.

12. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support in a substantially straight line between a mated position extending into one of the anchor receivers to establish a fixed elevated position of the headrest relative to the headrest support and an unmated position disengaging each of the anchor receivers to allow up-and-down movement of the headrest relative to the headrest support
wherein the headrest includes a head-engagement panel adapted to support a head of a juvenile seated on the seat bottom and the anchor retainer is coupled to a rearwardly facing surface of the head-engagement panel and arranged to extend in a rearward direction to lie alongside the headrest support to present the lowest and highest anchor receivers in confronting relation to the headrest anchor during up-and-down movement of the headrest on the headrest support
wherein the anchor retainer is a thin strip made of plastics material.

13. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support in a substantially straight line between a mated position extending into one of the anchor receivers to establish a fixed elevated position of the headrest relative to the headrest support and an unmated position disengaging each of the anchor receivers to allow up-and-down movement of the headrest relative to the headrest support
wherein the headrest includes a head-engagement panel adapted to support a head of a juvenile seated on the seat bottom and the anchor retainer is coupled to a rearwardly facing surface of the head-engagement panel and arranged to extend in a rearward direction to lie alongside the headrest support to present the lowest and highest anchor receivers in confronting relation to the headrest anchor during up-and-down movement of the headrest on the headrest support
wherein the headrest includes a monolithic section made of a plastics material and configured to include the head-engagement panel and the anchor retainer.

14. The seat unit of claim 13, wherein the headrest anchor includes an anchor button sized and arranged to extend into one of the lowest and highest anchor receiver upon movement of the headrest anchor to the mated position and a button-biasing spring arranged normally to urge the anchor button into one of the lowest and highest anchor receiver upon movement of the headrest on the headrest support to place the anchor button in confronting relation to one of the lowest and highest anchor retainer.

15. The seat unit of claim 14, wherein the headrest support further includes a support plate coupled to the seat back and the headrest anchor further includes a tether coupled to the anchor button and arranged to limit movement of the anchor button relative to the support plate.

16. The seat unit of claim 13, wherein the anchor button is arranged to lie in a space located between the anchor retainer and the headrest support during up-and-down movement of the headrest relative to the headrest support while the anchor button is withdrawn from each of the lowest and highest anchor receivers formed in the anchor retainer.

17. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, wherein the headrest includes a head-engagement panel adapted to support a head of a juvenile seated on the seat bottom and the anchor retainer is coupled to a rearwardly facing surface of the head-engagement panel and arranged to extend in a rearward direction to lie alongside the headrest support to present the lowest and highest anchor receivers in confronting relation to the headrest anchor during up-and-down movement of the headrest on the headrest support, wherein the headrest anchor includes an anchor button sized and arranged to extend into one of the lowest and highest anchor receiver upon movement of the headrest anchor to the mated position and a button-biasing spring arranged normally to urge the anchor button into one of the lowest and highest anchor receiver upon movement of the headrest on the headrest support to place the anchor button in confronting relation to one of the lowest and highest anchor retainer, wherein the headrest support further includes a support plate coupled to the seat back and the headrest anchor further includes a tether coupled to the anchor button and arranged to limit movement of the anchor button relative to the support plate, and wherein the anchor button is cylinder-shaped and the button-biasing spring is a coiled compression spring having an inner end acting against the support plate and an outer end acting against the cylinder-shaped anchor button.

18. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, wherein the headrest includes a head-engagement panel adapted to support a head of a juvenile seated on the seat bottom and the anchor retainer is coupled to a rearwardly facing surface of the head-engagement panel and arranged to extend in a rearward direction to lie alongside the headrest support to present the lowest and highest anchor receivers in confronting relation to the headrest anchor during up-and-down movement of the headrest on the headrest support, wherein the headrest anchor includes an anchor button sized and arranged to extend into one of the lowest and highest anchor receiver upon movement of the headrest anchor to the mated position and a button-biasing spring arranged normally to urge the anchor button into one of the lowest and highest anchor receiver upon movement of the headrest on the headrest support to place the anchor button in confronting relation to one of the lowest and highest anchor retainer, wherein the anchor button is arranged to lie in a space located between the anchor retainer and the headrest support during up-and-down movement of the headrest relative to the headrest support while the anchor button is withdrawn from each of the lowest and highest anchor receivers formed in the anchor retainer, and wherein the anchor button is cylinder-shaped and the button-biasing spring is a coiled compression spring having an inner end acting against the headrest support and an outer end acting against the cylinder-shaped anchor button.

19. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, wherein the headrest includes a head-engagement panel adapted to support a head of a juvenile seated on the seat bottom and the anchor retainer is coupled to a rearwardly facing surface of the head-engagement panel and arranged to extend in a rearward direction to lie alongside the headrest support to present the lowest and highest anchor receivers in confronting relation to the headrest anchor during up-and-down movement of the headrest on the headrest support, and wherein the headrest anchor includes an anchor button sized and arranged to extend through one of the lowest and highest anchor receiver upon movement of the headrest anchor to the mated position, wherein the anchor retainer is a strip of plastics material formed to include a lowest aperture defining the lowest anchor receiver and a highest aperture defining the highest anchor receiver, the headrest anchor further includes a button-biasing spring having an outer end acting against the anchor button and an inner end acting against the headrest support, the anchor button includes an inner portion arranged to lie in one of the lowest and highest apertures upon movement of the headrest anchor to the mated position, and the anchor button further includes an outer portion arranged to lie outside one of the lowest and highest apertures upon movement of the headrest anchor to the mated position and to pass through one of the lowest and highest apertures to overcome a biasing force applied by the button-biasing spring to the anchor button to reach a space provided between the anchor retainer and the headrest support upon movement of the headrest anchor to the unmated position to free the headrest for up-and-down movement relative to the headrest support.

20. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, wherein the headrest anchor includes an anchor button sized and arranged to extend into one of the lowest and highest anchor receiver upon movement of the headrest anchor to the mated position and a button-biasing spring arranged normally to urge the anchor button into one of the lowest and highest anchor receiver upon movement of the headrest on the headrest support to place the anchor button in confronting relation to one of the lowest and highest anchor retainer, and wherein the headrest is constrained to move up and down on the headrest support along a substantially vertical line and the anchor button is constrained to move back and forth on the headrest support along a substantially horizontal line, and further
wherein the anchor button is cylinder-shaped and the button-biasing spring is a coiled compression spring having an inner end acting against the headrest support and an outer end acting against the cylinder-shaped anchor button.

21. The seat unit of claim 20, wherein the anchor button is arranged to lie in a space located between the anchor retainer and the headrest support during up-and-down movement of the headrest relative to the headrest support while the anchor button is withdrawn from each of the lowest and highest anchor receivers formed in the anchor retainer.

22. A juvenile vehicle seat unit comprising
a seat including a seat bottom and a backrest including a headrest support positioned to lie in spaced-apart relation to the seat bottom and a seat back interposed between the seat bottom and the headrest support,
a headrest mounted for up-and-down movement on the headrest support between a lowest position located a first distance from the seat bottom and a highest position located a greater second distance from the seat bottom, and
a headrest height-adjustment mechanism including an anchor retainer coupled to the headrest for movement therewith, the anchor retainer being formed to include a lowest anchor receiver associated with the highest position of the headrest and a highest anchor receiver associated with the lowest position of the headrest, and a headrest anchor mounted for movement on the headrest support between a mated position extending into one of the anchor receivers to establish a fixed elevated position of the headrest relative to the headrest support and an unmated position disengaging each of the anchor receivers to allow up-and-down movement of the headrest relative to the headrest support, wherein the headrest anchor includes an anchor button sized and arranged to extend into one of the lowest and highest anchor receiver upon movement of the headrest anchor to the mated position and a button-biasing spring arranged normally to urge the anchor button into one of the lowest and highest anchor receiver upon movement of the headrest on the headrest support to place the anchor button in confronting relation to one of the lowest and highest anchor retainer, and wherein the anchor retainer is a strip of plastics material formed to include a lowest aperture defining the lowest anchor receiver and a highest aperture defining the highest anchor receiver, the anchor button includes an inner portion arranged to lie in one of the lowest and highest apertures upon movement of the headrest anchor to the mated position, and the anchor button further includes an outer portion arranged to lie outside one of the lowest and highest apertures upon movement of the headrest anchor to the mated position and to pass through one of the lowest and highest apertures to overcome a biasing force applied by the button-biasing spring to the anchor button to reach a space provided between the anchor retainer and the headrest support upon movement of the headrest anchor to the unmated position to free the headrest for up-and-down movement relative to the headrest support.

23. A juvenile vehicle seat unit comprising
a seat including a seat bottom and a backrest oriented to extend upwardly from the seat bottom,
a headrest mounted for up-and-down movement relative to the backrest, and
a headrest height-adjustment mechanism including first and second anchor retainers coupled to the headrest and arranged to lie in spaced-apart relation to one another to locate a headrest support included in the backrest between the first and second anchor retainer, wherein the headrest is mounted on the headrest support for up and down movement, the headrest height-adjustment mechanism further including a first anchor button associated with the headrest support and arranged to mate with the first anchor retainer to block up-and-down movement of the headrest relative to the headrest support and a second anchor button associated with the headrest support and arranged to mate with the second anchor retainer to block up-and-down movement of the headrest relative to the headrest support, wherein the headrest height-adjustment mechanism further includes a first tether coupled to the first anchor button and to the headrest support and arranged to limit movement of the first anchor button relative to the headrest support, and wherein the first tether includes a flexible lower button tether having a lower end coupled to the headrest support and an upper end coupled to the first anchor button and a flexible upper button tether having a lower end coupled to the first anchor button and an upper end coupled to the headrest support.

24. The seat unit of claim 23, wherein the backrest includes a monolithic section made of a plastics material and configured to include the anchor button, and the flexible upper and lower button tethers.

25. The seat unit of claim 23, wherein at least one of the flexible upper and lower button tethers has a serpentine shape.

26. The seat unit of claim 23, wherein each of the flexible upper and lower button tethers is made of a deformable elastic material.

27. The seat unit of claim 23, wherein the flexible lower and upper button tethers are made of a stiff material and cooperate to support the first anchor button for controlled movement relative to the headrest during movement of the first anchor button relative to the first anchor retainer.

28. The seat unit of claim 23, wherein the headrest height-adjustment mechanism further includes a second tether coupled to the second anchor button and to the headrest support and arranged to limit movement of the second anchor button relative to the headrest support.

29. A juvenile vehicle seat unit comprising
a seat including a seat bottom and a backrest oriented to extend upwardly from the seat bottom,
a headrest mounted for up-and-down movement relative to the backrest, and
a headrest height-adjustment mechanism including first and second anchor retainers coupled to the headrest and arranged to lie in spaced-apart relation to one another to locate a headrest support included in the backrest between the first and second anchor retainer, wherein the headrest is mounted on the headrest support for up and down movement, the headrest height-adjustment mechanism further including a first anchor button associated with the headrest support and arranged to mate with the first anchor retainer to block up-and-down movement of the headrest relative to the headrest support and a second anchor button associated with the headrest support and arranged to mate with the second anchor retainer to block up-and-down movement of the headrest relative to the headrest support, and wherein the headrest height-adjustment mechanism further includes a first button-biasing spring interposed between the first anchor button and the headrest support and arranged normally to urge the first anchor button in a first direction toward the first anchor retainer and a second button-biasing spring interposed between the second anchor button and the headrest support and arranged normally to urge the second anchor button in a second direction opposite to the first direction toward the second anchor retainer wherein each of the first and second anchor retainers is formed to include a highest anchor receiver associated with a lowest position of the headrest relative to the headrest support and a lowest anchor receiver associated with a highest position of the headrest relative to the headrest support, the headrest is located a first distance above the seat bottom upon movement to the lowest position and a greater second distance above the seat bottom upon movement to the highest position, the first anchor button is arranged to move relative to the headrest support between a mated position extending into one of the lowest and highest anchor receivers formed in the first anchor retainer to establish a fixed elevated position of the headrest relative to the headrest support and an unmated position disengaging each of the lowest and highest anchor receivers formed in the first anchor retainer to allow up-and-down movement of the headrest relative to the headrest support, and the second anchor button is arranged to move relative to the headrest support between a mated position extending into one of the lowest and highest anchor receivers formed in the first anchor retainer to establish a fixed elevated position of the headrest relative to the headrest support and an unmated position disengaging each of the lowest and highest anchor receivers formed in the second anchor retainer to allow up-and-down movement of the headrest relative to the headrest support wherein each of the first and second anchor buttons is cylinder-shaped, the first button-biasing spring is a coiled compression spring having an inner end acting against the headrest support and an outer end acting against the cylinder-shaped first anchor button, and the second button-biasing spring is a coiled compression spring having an inner end acting against the headrest support and an outer end acting against the cylinder-shaped second anchor bottom.

30. The seat unit of claim 29, wherein the first anchor button is arranged to lie in a first space located between the first anchor retainer and the headrest support during up-and-down movement of the headrest relative to the headrest support while the first anchor button is withdrawn from each of the lowest and highest anchor receivers formed in the first anchor retainer and the second anchor button is arranged to lie in a second space located between the second anchor retainer and the headrest support during up-and-down movement of the headrest relative to the headrest support while the second anchor button is withdrawn from each of the lowest and highest anchor receivers formed in the second anchor retainer.

31. A juvenile vehicle seat unit comprising
a seat including a seat bottom and a backrest oriented to extend upwardly from the seat bottom,
a headrest mounted for up-and-down movement relative to the backrest, and
a headrest height-adjustment mechanism including first and second anchor retainers coupled to the headrest and arranged to lie in spaced-apart relation to one another to locate a headrest support included in the backrest between the first and second anchor retainers, wherein the headrest is mounted on the headrest support for up and down movement, the headrest height-adjustment mechanism further including a first anchor button associated with the headrest support and arranged to move in a first direction to mate with the first anchor retainer to block up-and-down movement of the headrest relative to the headrest support, a second anchor button associated with the headrest support and arranged to move in a second direction opposite to the first direction to mate with the second anchor retainer to block up-and-down movement of the headrest relative to the headrest support, a first button-biasing spring coupled to the first anchor button and to the headrest support, and a second button-biasing spring coupled to the second anchor button and to the headrest support, wherein the headrest height-adjustment mechanism further includes a first tether coupled to the first anchor button and to the headrest support and arranged to limit movement of the first anchor button relative to the headrest support, wherein the first tether includes a flexible lower button tether having a lower end coupled to the headrest support and an upper end coupled to the first anchor button and a flexible upper button tether having a lower end coupled to the first anchor button and an upper end coupled to the headrest support, wherein the flexible lower and upper button tethers are made of a stiff material and cooperate to support the first anchor button for controlled movement relative to the headrest during movement of the first anchor button relative to the first anchor retainer, and wherein the first anchor retainer is a strip of plastics material formed to include a lowest aperture defining the lowest anchor receiver and a highest aperture defining the highest anchor receiver, the first anchor button includes an inner portion arranged to lie in one of the lowest and highest apertures of the first anchor retainer upon movement of the first anchor button to the mated position, and the first anchor button further includes an outer portion arranged to lie outside one of the lowest and highest apertures of the first anchor retainer upon movement of the first anchor button to the mated position and to pass through one of the lowest and highest apertures of the first anchor retainer to overcome a biasing force applied by the button-biasing spring to the first anchor button to reach a space provided between the first anchor retainer and the backrest upon movement of the first anchor button to the unmated position to free the headrest for up-and-down movement relative to the backrest.

32. A juvenile vehicle seat unit comprising
a seat base including a seat bottom,
a backrest including a seat back and a headrest support extending upwardly from the seat back, the backrest being coupled to the seat base to orient the seat back in an upright seat-forming position extending upwardly from the seat bottom,
a headrest mounted for up-and-down movement on the headrest support between a lowest position located a first distance from the seat bottom and a highest position located a greater second distance from the seat bottom, and
a headrest height-adjustment mechanism including an anchor retainer strip cantilevered to the headrest and arranged to extend in a rearward direction away from the headrest to lie alongside the headrest support, the anchor retainer strip being formed to include a lowest anchor receiver associated with the highest position of the headrest and a highest anchor receiver associated with the lowest position of the headrest, the headrest height-adjustment mechanism further including a spring-biased headrest anchor which is biased outwardly away from the headrest support in a direction toward and into one of the lowest and highest anchor receivers formed in the anchor retainer strip to block up-and-down movement of the headrest relative to the headrest support.

* * * * *